United States Patent [19]

Matsunaga et al.

[11] 3,976,605

[45] Aug. 24, 1976

[54] FOAMED PLASTICS OF RESIN COMPOSITIONS COMPRISING PULLULAN TYPE RESINS AND THERMOPLASTIC RESINS AND PROCESS FOR PRODUCING THE SAME

[75] Inventors: Hiroomi Matsunaga, Kobe; Kozo Tsuji, Ibaragi; Teruo Saito, Takatsuki, all of Japan

[73] Assignees: Sumitomo Chemical Company, Limited, Osaka; Hayashibara Biochemical Laboratories, Incorporated, both of Japan

[22] Filed: Mar. 18, 1975

[21] Appl. No.: 559,443

[30] Foreign Application Priority Data
Mar. 28, 1974 Japan.............................. 49-35873
May 21, 1974 Japan.............................. 49-57518

[52] U.S. Cl. .................... 260/2.5 HA; 260/2.5 R; 260/2.5 H; 260/2.5 HB; 260/2.5 E; 260/2.5 P; 260/2.5 N; 260/9; 260/17.4 ST; 260/17.4 SG; 260/30.8 DS; 260/31.4 R; 260/32.6 R; 260/32.6 N; 260/33.4 R; 260/33.4 EP; 260/33.4 PQ; 260/42.28; 260/42.45; 260/42.46; 260/42.47; 260/42.48; 260/42.49

[51] Int. Cl.$^2$............................................. C08J 9/06
[58] Field of Search........... 260/2.5 N, 2.5 P, 2.5 E, 260/2.5 H, 2.5 HA, 2.5 HB, 9 R, 17.4 ST, 17.4 SG

[56] References Cited
UNITED STATES PATENTS
3,888,809    6/1975    Nakashio et al...................... 260/9

*Primary Examiner*—Morton Foelak
*Attorney, Agent, or Firm*—Stevens, Davis, Miller & Mosher

[57] ABSTRACT

A foamed plastic of a resin composition comprising a pullulan type resin and a thermoplastic resin.

When a resin composition comprising a pullulan type resin and a thermoplastic resin is foamed, the resulting foamed plastic is improved in moisture and water absorptivity which is low in the case of a foamed plastic composed of the thermoplastic resin, and in water resistance which is low in the case of a foamed plastic composed of the pullulan type resin.

15 Claims, No Drawings

FOAMED PLASTICS OF RESIN COMPOSITIONS COMPRISING PULLULAN TYPE RESINS AND THERMOPLASTIC RESINS AND PROCESS FOR PRODUCING THE SAME

This invention relates to a foamed plastic of a resin composition comprising a pullulan type resin and a thermoplastic resin, and to a process for producing the same.

Heretofore, foamed plastics composed of thermoplastic resin, e.g. polyolefin type, polystyrene type and polyvinyl chloride type resins have been put, taking advantage of their characteristic properties, into various uses such as for leathers, sheets, containers, furniture materials, soundproofing materials, heat insulating materials, packaging materials, buffer materials, matting materials, etc. The foamed plastics are useful when put into uses where water resistance is required, since the thermoplastic resins themselves are hydrophobic, but are limited in uses in the case where moisture and water absorptivity is required. Further, the foamed plastics are easily charged with electricity, and hence have the disadvantage that dust tends to adhere thereto. Moreover, they are physically and chemically stable and are not destroyed by spontaneous destruction or decomposition, so that the abandonment thereof after use is quite difficult and has become even a social problem as one of the problems concerning environmental pollution. For example, when foamed plastics are discarded by burying them in the ground, depression of the ground takes place, while when they are subjected to combustion, there are brought about such problems as the occurrence of secondary pollution due to generation of large quantities of poisonous gases, and the damage to incinerators due to emission of enormous combustion heat. Further, when it is desired that they be regenerated, great expenses are required for the regeneration treatment. Recently, there has been made an attempt wherein foamed plastics are incorporated with photodecomposition promotors so as to be decomposed by irradiation from sunlight. However, in practice that said procedure is being scarcely utilized for the reasons that when foamed plastics are shielded from the sunlight as, for example, being placed in the shade or buried in the ground, no decomposition takes place, and that the decomposition promotors are high in cost and are toxic.

On the other hand, foamed plastics composed of pullulan type resins are more easily soluble in water than foamed plastics composed of conventional thermoplastic resins, are non-toxic, are edible, do not generate any poisonous gases even when burned, and are decomposed by microorganisms even when directed as they are, and hence are expected to be non-pollution-causing foamed plastics capable of being used in place of conventional petrochemical products.

However, the high water solubility, water absorptivity and hydrophilic property, which is a merit on one hand, results in a disadvantage due to the low water resistance, so that the foamed plastics composed of pullulan type resins are restricted in their application.

With an aim to overcome the above-mentioned disadvantages of foamed plastics composed of the thermoplastic resins and those composed of the pullulan type resins, the present inventors made extensive studies to find out the said disadvantages can be overcome by foaming a composition comprising a thermoplastic resin and a pullulan type resin. Based on the above finding, the inventors have accomplished the present invention.

An object of the present invention is to provide a foamed plastic of a resin composition comprising a thermoplastic resin and a puullulan type resin.

Another object of the invention is to provide a process for producing the above-mentioned foamed plastic.

A further object of the invention is to provide a foamed plastic of a thermoplastic resin which has been improved in moisture and water absorptivity.

A still further object of the invention is to provide a foamed plastic of a pullulan type resin which has been improved in water resistance.

Other objects and advantages of the invention will become apparent from the following description.

In accordance with the present invention, there is provided a process for producing a foamed plastic, characterized in that a resin composition comprising a thermoplastic resin, a pullulan type resin, a plasticizer for the pullulan type resin and, if necessary, a foaming agent, is molded at a temperature between the plasticization temperature and the decomposition temperature of said resin composition and a temperature above the gas-liberating temperature of said plasticizer or foaming agent.

When the amount of the pullulan type resin is 2 to 50% by weight based on the weight of the total resin, there is obtained a foamed plastic which has been improved in moisture and water absorptivity, which is the drawback of the thermoplastic resin, while when the amount of the thermoplastic resin is 2 to 50% by weight based on the weight of the total resin, there is obtained a foamed plastic which has been improved in water resistance, which is the drawback of the pullulan type resin.

The thermoplastic resin referred to in the present invention includes polyethylene, polypropylene, polystyrene, acrylonitrile-butadiene-styrene copolymer, polymethyl methacrylate, polyvinyl acetate, polyvinyl chloride, polyvinylidene chloride, vinyl acetate-vinyl chloride copolymer, olefin-vinyl acetate copolymers such as, for example, ethylene-vinyl acetate copolymer, propylene-vinyl acetate copolymer, and the like, polycarbonates, polyacetals, polysulfones, polyamides, polyesters and mixtures thereof.

The pullulan referred to in the present invention is a high molecular weight linear polymer wherein units of maltotriose, which is a trimer of glucose, have been repeatedly bonded through α-1,6 linkages which are different from those of said trimer, and has the molecular structure represented by the formula,

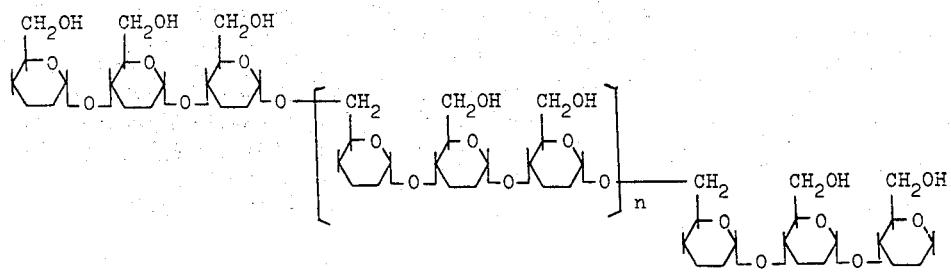

wherein n is an integer of 20 to 10,000 which shows the polymerization degree.

The pullulan used in the present invention is not particularly limited regarding the process for production thereof. At present, it can be isolated and recovered as a tacky substance secreted in a culture liquor of a strain belonging to the genus Pullularia which is an incomplete microgranism. That is, a strain of the species *Pullularia pullulans* is subjected to shaking culture at 24°C. for 5 days in a medium containing 10% of sucrose or glucose, 0.5% of $K_2HPO_4$, 0.1% of NaCl, 0.02%, of $MgSO_4 \cdot 7H_2O$, 0.06% of $(NH_4)_2SO_4$ and 0.04% of yeast extract, whereby pullulan is obtained as a tacky substance secreted from the cells into the culture liquor. If necessary, the cells are removed by centrifugation from the culture liquor, and the supernatant is subjected to precipitation and separation with methanol, whereby purified pullulan can be obtained.

Pullulan somewhat varies in physical properties depending on the kind of strain used. This, however, is not greatly connected to the properties of the foamed plastic of a resin composition which is obtained by the present invention.

The molecular weight of the pullulan used in the present invention is not particularly limited, but is preferably from 10,000 to 5,000,000, more preferably from 10,000 to 1,000,000.

It is well known that pullulan is easily soluble in cold water but can be varied in water-solubility when modified by etherification, esterification, or graft-copolymerization with a vinyl compound. When the thus modified pullulan is incorporated with a plasticizer therefor, a thermoplastic resin and, if necessary, a foaming agent, and the resulting resin composition is foamed at above the plasticization temperature and below the decomposition temperature of the resin composition, it is also possible to obtain a foamed plastic, as in the case of pullulan. Accordingly, the pullulan type resin referred to in the present invention includes not only pullulan resins but also resins that have partly been modified by etherification or esterification.

The plasticization temperature of the pullulan type resin used in the present invention varies depending on the molecular weight of the pullulan, the manner and degree of pullulan modification and the kind and amount of the plasticizer employed, but can freely be controlled within the range of from 40°C. to the decomposition temperature thereof, in general. The decomposition temperature of the pullulan type resin is a temperature wherein the resin, when heated gradually, begins to generate heat due to oxidative decomposition and to show marked decrease in weight. The decomposition temperature of pullulan is in the range from 250° to 260°C., while that of modified pullulan is in the range from 170° to 300°C., though this varies depending on the manner and degree of modification.

Examples of the plasticizer for pullulan type resin which are used in the present invention are water; polyhydric alcohols such as glycerin, ethylene glycol, polyethylene glycol, sorbitol, propylene glycol and polypropylene glycol; amides such as dimethylformamide; amines such a triethylenetetramine, diethylenetriamine, ethanolamine, propylamine, propylenediamine, butylamine and ethylamine; and dimethyl sulfoxide. These plasticizers may be used either singly or in the form of a mixture of two or more members.

The amount of the plasticizer to be incorporated into the resin composition is not particularly limited, but is ordinarily 1 to 50 wt % based on the total weight of the resin composition.

The process for incorporating a plasticizer into a pullalan type resin or for incorporating a plasticizer-containing pullalan type resin into a thermoplastic resin is not particularly limited, but there may be adopted a process such as is mentioned below.

That is, for incorporation of a plasticizer into a pullalan type resin, there may be employed a process in which, when water is used as the plasticizer, the pullalan type resin is allowed to stand in a high humidity atmosphere to absorb moisture into the resin; a process in which particles, flakes or pellets of the pullalan type resin are uniformly sprayed with the plasticizer to absorb the plasticizer into the resin; or a process in which the pullalan type resin is dissolved in a large amount of the plasticizer. For incorporation of a plasticizer-containing pullalan resin into a thermoplastic resin, there may be employed a process in which powders of the two resins are stirred and mixed together by use of a mixer; a process in which the thermoplastic resin and the pullalan type resin are kneaded together in a molten state by use of a hot roll, an extruder or a calendar roll; or a process in which a solution of the thermoplastic resin and a solution of the pullalan type resin are stirred and mixed together.

During the mixing of these resins, or at the time of subjecting the resulting resin composition to such molding process as compression molding, injection molding or extrusion molding, the resins or the resin composition may be incorporated, according to the application purpose of the resulting foamed plastic, with proper amounts of such additives as pigments, dyes, inorganic fillers, stabilizers, flame retardants, etc.

The foaming agent to be used in the process of the present invention may be any of a heat-decomposable solid foaming agent, a volatile liquid foaming agent and a gaseous foaming agent. However, the foaming agent should be inert in the sense that it does not react with the resin composition under molding conditions, and should be a compound capable of liberating a gas at a temperature between the plasticization temperature and the decomposition temperature of the resin composition, though it is needless to say that the plasticizer should be gaseous at the molding temperature.

Examples of the solid foaming agent suitable for use in the process of the present invention are organic solid foaming agents such as dinitropentamethylenetetramine, azodicarbonamide, azobisisobutyronitrile, p,p-hydroxybis-benzenesulfonyl hydrazide, and the like azo compounds which decompose at below the molding temperature. The said organic solid foaming agent is preferably used in an amount of 0.1 to 30 weight % based on the weight of the resin composition.

It is also possible to use a solid foaming agent capable of yielding carbon dioxide and water which includes organic acids such as citric, tartaric, diglycolic and oxalic acids, and inorganic salts such as sodium carbonate, potassium carbonate, sodium bicarbonate and potassium bicarbonate. This solid foaming agent, however, is desirably used as an assistant foaming agent for making foams uniform and fine to increase the product in whiteness and softness. In this case, the amount of the assistant foaming agent is preferably 0.1 to 5 wt % based on the weight of the resin composition.

Even if the gas-liberating temperature of the above-mentioned solid foaming agent is higher than the decomposition temperature of the resin composition, the gas-liberating temperature can be lowered when the foaming agent is used in combination with a proper foaming assistant, and thus the said foaming agent can be used in the present invention without any injury.

Examples of the volatile liquid foaming agent suitable for use in the process of the present invention are low boiling point aliphatic ketones such as acetone and methyl ethyl ketone; low boiling point esters such as methyl acetate, ethyl acetate, methyl formate and ethyl formate; aliphatic lower alcohols such as methanol and ethanol; normally liquid low boiling point hydrocarbons such as pentane, hexane, heptane, petroleum ether, cyclopentane and cylcopentadiene; and halogen-containing normally liquid volatile hydrocarbons such as methyl chloride, ethyl chloride, chloroform, methylene bromide and dichlorodifluoromethane. The amount of the volatile liquid foaming agent to be used is preferably 1 to 10 wt % based on the weight of the resin composition.

Examples of the gaseous foaming agent suitable for use in the process of the present invention are normally gaseous compounds such as nitrogen, carbon dioxide, helium, methane, ethane, propane, butane, ethylene, propylene and gaseous halogenated hydrocarbons. The amount of the gaseous foaming agent to be used is preferably 1 to 10 wt % based on the weight of the resin composition.

In the present invention, any of a solid foaming agent, a volatile liquid foaming agent and a gaseous foaming agent may also be used in combination. The amount of the foaming agents to be used are suitably selected depending on the desired foamed ratio of the foamed articles and the kind of foaming agents.

In the present invention, there may be used a core material in order to make the size of foams of the resulting foamed plastic fine and uniform. Preferable examples of the core materials are metal oxides such as silica, titania, alumina, barium oxide and magnesium oxide, and metal salts such as sodium chloride, potassium bromide, magnesium phosphate, barium sulfate, aluminum sulfate, boron nitride and magnesium silicate such as talc which have been finely divided to a size of 0.01 to 5 $\mu$. The amount of the core material to be used is preferably in the range of 0.1 to 5 wt % based on the weight of the resin composition.

In the present invention, the process for incorporating the foaming agent into the resin composition may be any of the known processes adopted in the case of thermoplastic resins. That is, there may be employed a process in which a resin composition containing the foaming agent is first prepared prior to molding and is used as the starting material to be subjected to molding, or a process in which the foaming agent is introduced into the molding machine during the course of molding.

In case the foaming agent is a heat-decomposable solid foaming agent, it may be mixed with the resin composition, which has been plasticized by means of an extruder or a mixing roll at a temperature below the decomposition temperature of the foaming agent. In case the foaming agent is a volatile liquid foaming agent, it may be permeated under pressure into the resin composition, or may be charged under pressure into the plasticized resin through the barrel of a screw extruder or a screw type injection molding machine. In case the foaming agent is a gaseous foaming agent, it may be charged under pressure into the plasticized resin through the barrel of a screw extruder of a screw type injection molding machine, as in the case of the volatile liquid foaming agent.

In the present invention, the molding process for producing a foamed plastic may be carried out according to any of extrusion-molding using a screw extruder, injection-molding using a screw type injection molding machine, blow-molding using a blow molding machine and press-molding using a press, and may suitably be selected according to the desired shape and uses of the resulting foamed plastic. In any of the above-mentioned cases, a homogenous mixture of the resin plasticized in a molding machine kept under a high pressure and a gas generated from the plasticizer or the foaming agent is extruded, injected or released into such a low pressure zone as air, whereby the gas is expanded to give a foamed plastic.

The foamed plastic obtained by the process of the present invention, which is composed of a thermoplastic resin and a pullalan type resin, comes to have characteristic properties of the two resins. Consequently, in case the foamed plastic is one which is composed of a major proportion of the thermoplastic resin and a minor proportion of the pullalan type resin, it is free from low moisture and water absorptivity and high static electricity which are drawbacks of the thermoplastic resin, while in case the foamed plastic is one which is composed of a major proportion of the pullalan type resin and a minor proportion of the thermoplastic resin, it is free from low water resistance which is a drawback of the pullalan type resin.

Further, in the case of disposal of the foamed plastic obtained by the process of the present invention, there occur no such various problems as are encountered in the case of a foamed plastic composed of only the thermoplastic resin. That is, the amount of heat generated at the time of combustion of the foamed plastic obtained by the process of the present invention is smaller than that of the foamed plastic composed of only the thermoplastic resin, so that the incinerator used for the combustion can be protected from damage. Further, the foamed plastic composed of only the thermoplastic resin is not decomposed when allowed to stand over a long period of time in the natural world, whereas the foamed plastic containing the pullalan type resin is destroyed in shape when the pullalan type resin is dissolved out with water and thus becomes easily decomposable. Moreover, the pullalan type resin is microorganism-decomposable, so that the foamed plastic containing the pullalan type resin can be easily decomposed by microorganisms. Thus, the foamed plastic of the present invention can be said to be a non-pollution-causing foamed plastic.

The present invention is illustrated in more detail below with reference to examples, but the invention is not limited to the examples.

EXAMPLE 1

A polypropylene (Sumitomo Noblen W-501, produced by Sumitomo Chemical Co.; density 0.910 g/cm$^3$, melt index 8) was sufficiently mixed by means of a mixer with 20% by weight, based on the total resin weight, of a pullalan resin powder (molecular weight 100,000) containing 20 wt % of water. The resulting mixture was fed to an extruder (screw diameter 30 mm., L/D = 20), and was continuously extruded into air through a die (width 200 mm., lip interval 3 mm.) attached to the end of the extruder with a screw rotation number of 30 r.p.m. at a resin temperature of 200°C. to obtain a foamed sheet. This sheet had a foamed ratio of about 3 times the original volume and had uniform cells.

EXAMPLE 2

100 Parts by weight of a vinyl chloride resin (Sumilit PXN, produced by Sumitomo Chemical Co.; polymerization degree, 1,300) was mixed with 60 parts by weight of a plasticizer (dioctyl phthalate), 2 parts by weight of a stabilizer (tradename: KP-150, produced by Kyodo Phermaceutical Co., complex stabilizer containing Cd, Ba and Zn diluted in kerosene), and 30% by weight, based on the total resin weight, of a pullalan resin (molecular weight 150,000) containing 50 wt % of water. The resulting mixture was sufficiently kneaded by means of a mortar to form a homogeneous plastisol, which was then spread by use of an applicator over an aluminum plate of 0.5 mm. in thickness to prepare a sheet having a thickness of 3 mm. This sheet was heat-treated for 10 minutes in a hot air furnace kept at 190°C. to obtain a sheet having a foamed ratio of 5 times the original volume and having uniform cells.

EXAMPLE 3

A polyethylene (Sumikathene L-705, produced by Sumitomo Chemical Co.; density 0.92 g/cm$^3$, melt index 7) was sufficiently mixed by means of a mixer with 20% by weight, based on the total resin weight, of an acetylated pullalan powder (molecular weight 80,000) containing 10 wt % of water and 5 wt % of ethylene glycol and having a substitution degree of 0.5 (complete substitution degree = 3.0). The resulting mixture was subjected to compression molding at 140°C. to prepare a sheet of 160 mm × 160 mm × 3 mm in size. This sheet was then subjected to dielectric heating by applying thereto a high frequency voltage (2,450 MHz) in a home microwave oven to obtain a sheet having a foamed ratio of 2.5 times the original volume and having uniform cells.

EXAMPLE 4

90 Parts by weight of a dry pullalan powder (molecular weight 200,000) was homogenously incorporated with 25 wt % of water, and then mixed with 10 parts by weight of a polyethylene (Sumikathene L-705, produced by Sumitomo Chemical Co.; density 0.92 g/cm$^3$, melt index 7), 0.5 part by weight of sodium bicarbonate and 0.4 part by weight of citric acid. The resulting mixture was fed to the hopper of an extruder (screw diameter 50 mm., L/D = 28), and was sufficiently plasticized therein by heating to 150°C. while kneading and conveying the mixture within the extruder. During this time, 15 parts by weight, based on the total resin weight, of dichlorodifluoromethane was injected under a pressure of 70 kg/cm$^2$ into the extruder through a foaming agent-injecting hole bored in the barrel of the extruder, and was sufficiently mixed with the plasticized resin composition. Subsequently, the resin composition was continuously extruded at a resin temperature of 110°C. into air through a die for forming a foamed sheet of 10 mm. in thickness, which die had been attached to the end of the extruder, to obtain a sheet. This sheet had a foamed ratio of about 20 times the original volume and had uniform cells.

EXAMPLE 5

100 Parts by weight of a vinyl chloride resin (Sumilit PXN, produced by Sumitomo Chemical Co.; polymerization degree, 1,300) was mixed with 60 parts by weight of a plasticizer (dioctyl phthalate), 2 parts by weight of a stabilizer (tradename: KP-150, produced by Kyodo Phermaceutical Co., complex stabilizer containing Cd, Ba and Zn diluted in kerosene), 1 part by weight of azodicarbonamide as a foaming agent, 0.5 part by weight of zinc stearate as a foaming assistant, and 20% by weight, based on the total resin weight, of an acetylated pullalan resin powder (molecular weight 55,000) containing 20 wt % of water and having a substitution degree of 0.5 (complete substitution degree = 3.0). The resulting mixture was sufficiently kneaded at 30°C. by means of a mortar to form a homogenous plastisol, which was then spread by use of an applicator over an aluminum plate of 0.5 mm. in thickness to prepare a sheet having a thickness of 3 mm. This sheet was heat-treated for 10 minutes in a hot air furnace kept at 190°C. to obtain a sheet having a foamed ratio of 10 times the original volume and having uniform cells.

EXAMPLE 6

Example 5 was repeated, except that the water contained in the pullalan resin powder was replaced by ethylene glycol, to obtain a sheet having a foamed ratio of 7 times the original volume and having uniform cells.

What is claimed is:

1. A foamed plastic of a resin composition comprising 2 to 98% by weight based on the total resin weight of a pullalan type resin having a molecular weight of 10,000 to 5,000,000 selected from the group consisting of pullalan, an etherified pullalan and an esterified pullalan and 98 to 2% by weight based on the total resin weight of at least one thermoplastic resin selected from the group consisting of polyethylene, polypropylene, polystyrene, acrylonitrile-butadiene-styrene copolymer, polymethyl methacrylate, polyvinyl acetate, polyvinyl chloride, polyvinylidene chloride, vinyl acetate-vinyl chloride copolymer, olefin-vinyl acetate copolymers, polycarbonates, polyacetals, polysulfones, polyamides and polyesters.

2. A process for producing a foamed plastic, characterized in that a resin composition comprising 2 to 98% by weight based on the total resin weight of a pullalan type resin having a molecular weight of 10,000 to 5,000,000 selected from the group consisting of pullalan, an etherified pullalan and an esterified pullalan, 98 to 2% by weight based on the total resin weight of at least one thermoplastic resin selected from the group consisting of polyethylene, polypropylene, polystyrene, acrylonitrile-butadiene-styrene copolymer, polymethyl methacrylate, polyvinyl acetate, polyvinyl chloride, polyvinylidene chloride, vinyl acetate-vinyl chloride copolymer, olefin-vinyl acetate copolymers, polycarbonates, polyacetals, polysulfones, polyamides and polyesters, and 1 to 50% by weight based on the weight of the resin composition of at least one plasticizer for the pullulan type resin selected from the group consisting of water, glycerine, ethylene glycol, polyethylene glycol, sorbitol, propylene glycol, polypropylene glycol, dimethylformamide, triethylenetetramine, diethylenetriamine, ethanolamine, propylamine, propylenediamine, butylamine, ethylamine and dimethylsulfoxide is molded by liberating a vapor of said plasticizer from the resin composition at a temperature above the plasticization temperature and below the decomposition temperature of said resin composition.

3. A process for producing a foamed plastic, characterized in that a resin composition comprising 2 to 98% by weight based on the total resin weight of a pullalan type resin having a molecular weight of 10,000 to 5,000,000 selected from the group consisting of pullalan, an etherified pullalan and an esterified pullalan, 98 to 2% by weight based on the total resin weight of at least one thermoplastic resin selected from the group consisting of polyethylene, polypropylene, polystyrene, acrylonitrile-butadiene-styrene copolymer, polymethyl methacrylate, polyvinyl acetate, polyvinyl chloride, polyvinylidene chloride, vinyl acetate-vinyl chloride copolymer, olefin-vinyl acetate copolymers, polycarbonates, polyacetals, polysulfones, polyamides and polyesters, 1 to 50% by weight based on the weight of the resin composition of at least one plasticizer for the pullalan type resin selected from the group consisting of water, glycerine, ethylene glycol, polyethylene glycol, sorbitol, propylene glycol, polypropylene glycol, dimethylformamide, triethylenetetramine, diethylenetriamine, ethanolamine, propylamine, propylenediamine, butylamine, ethylamine and dimethyl sulfoxide, and at least one foaming agent selected from the group consisting of solid foaming agents, volatile liquid foaming agents and gaseous foaming agents is molded at a temperature above the plasticization temperature and below the decomposition temperature of said resin composition and at a temperature above the gas-liberating temperature of said foaming agent.

4. A process according to claim 3, wherein the solid foaming agent is dinitropentamethylenetetramine, azodicarbonamide, azobisisobutyronitrile, or p,p-hydroxybisbenzenesulfonyl hydrazide.

5. A process according to claim 4, wherein the amount of the solid foaming agent is 0.1 to 30% by weight based on the weight of the resin composition.

6. A process according to claim 3, wherein an assistant foaming agent is used.

7. A process according to claim 6, wherein the assistant foaming agent is citric acid, tartaric acid, diglycolic acid, oxalic acid, sodium carbonate, potassium carbonate, sodium bicarbonate or potassium bicarbonate.

8. A process according to claim 6, wherein the amount of the assistant foaming agent is 0.1 to 5% by weight based on the weight of the resin composition.

9. A process according to claim 3, wherein the volatile liquid foaming agent is acetone, methyl ethyl ketone, methyl acetate, ethyl acetate, methyl formate, ethyl formate, methanol, ethanol, pentane, hexane, heptane, petroleum ether, cyclopentane, cyclopentadiene, methyl chloride, ethyl chloride, chloroform, methylene bromide or dichlorodifluoromethane.

10. A process according to claim 3, wherein the amount of the volatile liquid foaming agent is 1 to 10% by weight based on the weight of the resin composition.

11. A process according to claim 3, wherein the gaseous foaming agent is nitrogen, carbon dioxide, helium, methane, ethane, propane, butane, ethylene, propylene or a gaseous halogenated hydrocarbon.

12. A process according to claim 3, wherein the amount of the gaseous foaming agent is 1 to 10% by weight based on the weight of the resin composition.

13. A process according to claim 2, wherein a core material selected from the group consisting of silica, titania, alumina, barium oxide, magnesium oxide, sodium chloride, potassium bromide, magnesium phosphate, barium sulfate, aluminum sulfate, boron nitride or talc of 0.01 to 5 microns in size is incorporated into the resin composition.

14. A process according to claim 13, wherein the amount of the core material is 0.01 to 5% by weight based on the weight of the resin composition.

15. A process according to claim 3, wherein a core material selected from the group consisting of silica, titania, alumina, barium oxide, magnesium oxide, sodium chloride, potassium bromide, magnesium phosphate, barium sulfate, aluminum sulfate, boron nitride or talc of 0.01 to 5 microns in size is incorporated into the resin composition.

* * * * *